United States Patent
Chen et al.

(10) Patent No.: US 10,606,632 B2
(45) Date of Patent: Mar. 31, 2020

(54) PREVENTING INTERRUPTION DURING VIRTUAL MACHINE REBOOT

(71) Applicant: VMware, Inc., Palo Alto, CA (US)

(72) Inventors: Zhikai Chen, Beijing (CN); Shengbo Teng, Beijing (CN); Zhibin He, Beijing (CN); Wenping Fan, Beijing (CN); Xi Chen, Beijing (CN)

(73) Assignee: VMware, Inc., Palo Alto, CA (US)

( * ) Notice: Subject to any disclaimer, the term of this patent is extended or adjusted under 35 U.S.C. 154(b) by 37 days.

(21) Appl. No.: 15/980,732

(22) Filed: May 15, 2018

(65) Prior Publication Data

US 2019/0354392 A1  Nov. 21, 2019

(51) Int. Cl.
*G06F 9/455* (2018.01)
*G06F 11/14* (2006.01)

(52) U.S. Cl.
CPC ...... *G06F 9/45558* (2013.01); *G06F 11/1438* (2013.01); *G06F 11/1464* (2013.01); *G06F 11/1484* (2013.01); *G06F 2009/45562* (2013.01); *G06F 2009/45575* (2013.01); *G06F 2009/45579* (2013.01)

(58) Field of Classification Search
CPC .. G06F 9/45558; G06F 9/455; G06F 9/45533; G06F 9/461; G06F 9/485; G06F 9/4856; G06F 9/4868; G06F 11/1466; G06F 11/1484; G06F 8/65; G06F 8/70
See application file for complete search history.

(56) References Cited

U.S. PATENT DOCUMENTS

| | | | |
|---|---|---|---|
| 8,151,263 B1* | 4/2012 | Venkitachalam | G06F 9/485 711/162 |
| 9,110,693 B1* | 8/2015 | Meiri | G06F 9/4856 |
| 9,110,762 B2* | 8/2015 | Russinovich | G06F 9/45545 |
| 9,323,565 B2* | 4/2016 | Li | G06F 9/45558 |
| 9,575,792 B2* | 2/2017 | Robinson | G06F 9/45558 |
| 9,852,011 B1* | 12/2017 | Yemini | G06F 9/5083 |
| 9,929,931 B2* | 3/2018 | Breitgand | G06F 9/45558 |
| 10,353,733 B1* | 7/2019 | Kommera | G06F 9/45558 |
| 2008/0104588 A1* | 5/2008 | Barber | G06F 8/63 718/1 |
| 2010/0106885 A1* | 4/2010 | Gao | G06F 8/65 711/6 |
| 2011/0208908 A1* | 8/2011 | Chou | G06F 11/1662 711/112 |
| 2012/0084520 A1* | 4/2012 | Chou | G06F 11/1484 711/162 |

(Continued)

*Primary Examiner* — Hiren P Patel
(74) *Attorney, Agent, or Firm* — Clayton, McKay & Bailey, PC

(57) ABSTRACT

A system can allow a user to continue using a virtual machine while a background reboot occurs on a clone of the virtual machine. A backup agent operating on a server can receive a request from a virtual machine operating in an active state, to complete a reboot operation without operational interruption. A hypervisor can clone the virtual machine. During and after cloning, the backup agent can cause a filter agent to capture changes to the virtual machine. The virtual machine clone can notify the backup agent that the reboot is complete. Changes made in the interim on the virtual machine can be integrated on the virtual machine clone. Then the hypervisor can transition usage from the virtual machine to the virtual machine clone.

20 Claims, 10 Drawing Sheets

(56) References Cited

U.S. PATENT DOCUMENTS

| | | | |
|---|---|---|---|
| 2012/0180040 A1* | 7/2012 | DeLuca | H04L 67/2861 |
| | | | 718/1 |
| 2012/0227038 A1* | 9/2012 | Hunt | G06F 9/45558 |
| | | | 718/1 |
| 2013/0132945 A1* | 5/2013 | Anderson | G06F 8/65 |
| | | | 718/1 |
| 2014/0122941 A1* | 5/2014 | Pan | G06F 11/328 |
| | | | 714/45 |
| 2014/0244950 A1* | 8/2014 | Baron | G06F 3/065 |
| | | | 711/162 |
| 2015/0074054 A1* | 3/2015 | Antony | G06F 9/45558 |
| | | | 707/639 |
| 2016/0164762 A1* | 6/2016 | Reque | G06F 9/5077 |
| | | | 718/1 |
| 2016/0335111 A1* | 11/2016 | Bruun | G06F 9/45558 |
| 2016/0378527 A1* | 12/2016 | Zamir | G06F 9/45558 |
| | | | 711/162 |
| 2017/0147819 A1* | 5/2017 | Vasilenko | G06F 21/566 |
| 2018/0225108 A1* | 8/2018 | Fukui | G06F 8/65 |
| 2018/0248750 A1* | 8/2018 | Johnston | H04L 41/082 |
| 2018/0260237 A1* | 9/2018 | Noll | G06F 9/45558 |
| 2019/0265998 A1* | 8/2019 | Shantamurty | G06F 9/45558 |

\* cited by examiner

PREVENTING INTERRUPTION DURING VIRTUAL MACHINE REBOOT

BACKGROUND

Enterprises are increasingly utilizing virtual machines to provide flexible computing environments for work purposes. For example, computing devices can instantiate virtual machines hosted by a server, allowing workers to access a desktop and enterprise applications that run in the respective virtual machine. The virtual machine can simulate an operating system that supports multiple applications, and provide a managed computing environment to a user. In addition, instances of virtual machines can be advantageously accessed remotely, such as at a server, allowing further work flexibility for the enterprise.

However, virtual machines sometimes need to reboot for updates to applications or an operating system, similarly to non-virtual environments. For example, when an operating system in the virtual machine requires an update, the virtual machine restarts and configures new operating system features. During this time, the user cannot use the virtual machine. A reboot can involve multiple time-consuming operations, software updates or installations, and patch or driver installations. As a result, a user must stop working and will lose valuable time that could normally be used for production. The user can also experience various inefficiencies when restarting work after the virtual machine is ready. The problem also exists when the virtual machine is a virtualization of a server, in which case the reboot can simultaneously interrupt multiple user sessions hosted by the virtual machine.

Therefore, a need exists for systems and methods that manage reboot operations for virtual machines and enable a reboot to be completed without interrupting operations and a user's productive utilization of a virtual machine.

SUMMARY

Examples described herein include systems and methods for managing reboot operations of virtual machines. In one example, a virtual machine being used by at least one user can detect that a reboot is needed. For example, the reboot can be needed to update an operating system or an application of the virtual machine. The virtual machine can prompt a user to allow for the reboot operation to be completed locally or in a background. If the user opts for the reboot to take place in the background, the virtual machine can be cloned and the cloned virtual machine can perform the reboot and update while the user continues using the original virtual machine. Changes made at the original virtual machine during the reboot can then be added to the cloned virtual machine once the reboot is complete.

In one example, a virtual machine (VM) can be operating in an active state as it is utilized through a computing device by a user. The active state can include the VM performing normal I/O operations caused by user, internal operating system, network, or enterprise computing system interactions. Upon receiving a request from the user for a reboot to be performed in the background, the VM can send a request to a backup agent to complete the reboot without an operational interruption to the VM. In one example, a pre-shutdown service on the VM can recognize the reboot, cause the user to be prompted to select a native or background reboot option, and send the request to the backup agent. The backup agent can be a service operating on a virtual machine server separately from the virtual machines, such as the VM, accessed from the virtual machine server. Alternatively, the backup agent can execute on a different server.

In response to the request, the backup agent can instruct a hypervisor to clone the VM, and generate a VM clone (VMC) that performs the reboot while operating in a maintenance state. The hypervisor can generate, manage, and support multiple virtual machines that can be accessed from the virtual machine server. The VMC can include a copy of the VM with the same application settings and registry data. The maintenance state may encompass substantially all operations that can be executed by a virtual machine operating in the active state. However, these operations are executed while the virtual machine is not being implemented on a computing device that is different from the virtual machine server.

In one example, the VM can cancel its own native reboot operation in response to the background reboot selection, or in response to a message from the backup agent confirming the VM will be cloned. Instead of rebooting, the VM can continuously capture changes to the VM that occur during and after a cloning process. In one example, a filter agent executing on the VM captures these changes. In one example, the backup agent can send a message to the VM that causes the filter agent to begin collecting the changes.

The VMC can notify the backup agent it has completed the reboot operation. In response, the backup agent can transmit, or cause the VM to transmit, the changes captured by the filter agent to the VMC for integration. Subsequently, an instruction can be issued to the hypervisor to switch user control over to the VMC, transitioning the VM to a dormant state and the VMC to the active state. In one example, the dormant state can include a virtual machine, being stored on a server with a respective operating system completely inactive, and thus ceasing from any operations. In one example, the backup agent instructs the hypervisor to transition based on a notification from the VM that the changes have been transmitted. Alternatively, the backup agent itself transmits the changes to the VMC and can instruct the hypervisor to transition control to the VMC after the changes are transmitted.

With respect to the transitions, the hypervisor can cause the VMC to be displayed by and controlled through the computing device. The instruction causing the transitions can specify a removal protocol for the virtual machine. The hypervisor can immediately delete the virtual machine, or maintain it in an accessible location until deleted automatically or through an authorization process. In one example, the hypervisor can remove the virtual machine to a storage space of the VMC for a predetermined period of time prior to deletion.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for managing reboot operations of virtual machines. A backup agent operating on a server can receive a request from a virtual machine for a reboot operation without operational interruption. A service operating on the virtual machine can issue the request to the backup agent. In response, the backup agent can send a first instruction to a hypervisor to clone the virtual machine and generate a virtual machine clone. The virtual machine can remain active for use by the user, while the virtual machine clone performs the reboot. The backup agent can cause the virtual machine to implement a filter agent that continuously captures changes to the virtual machine. The virtual machine clone can notify the backup agent it has completed the reboot. The backup agent can transmit, or cause the virtual machine to transmit, the changes to the virtual machine clone for integration.

A second instruction can be issued to the hypervisor causing the hypervisor to transition the user from the virtual machine to the virtual machine clone. This can include setting the virtual machine to a dormant state and the virtual machine clone to the active state. For example, the hypervisor can cause the computing device to implement the virtual machine clone instead of the virtual machine. The second instruction can be issued by the backup agent and specify a removal protocol for the virtual machine. For example, the hypervisor can immediately delete the virtual machine, or maintain it in an accessible location until deleted automatically or through an authorization process.

Figure 1:
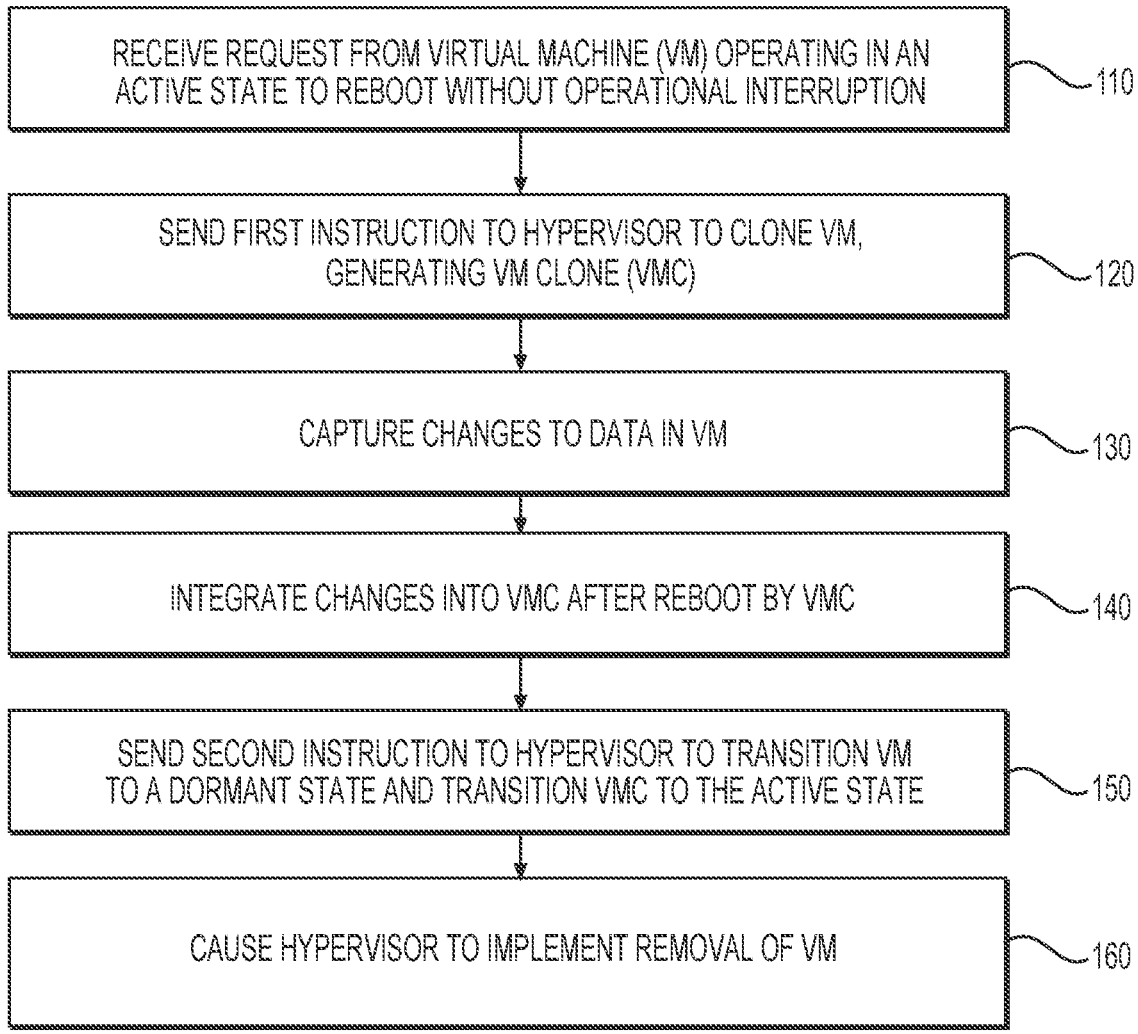
FIG. 1 is a flowchart of an exemplary method for cloning a virtual machine and integrating changes to the virtual machine into a virtual machine clone.
Figure 2:
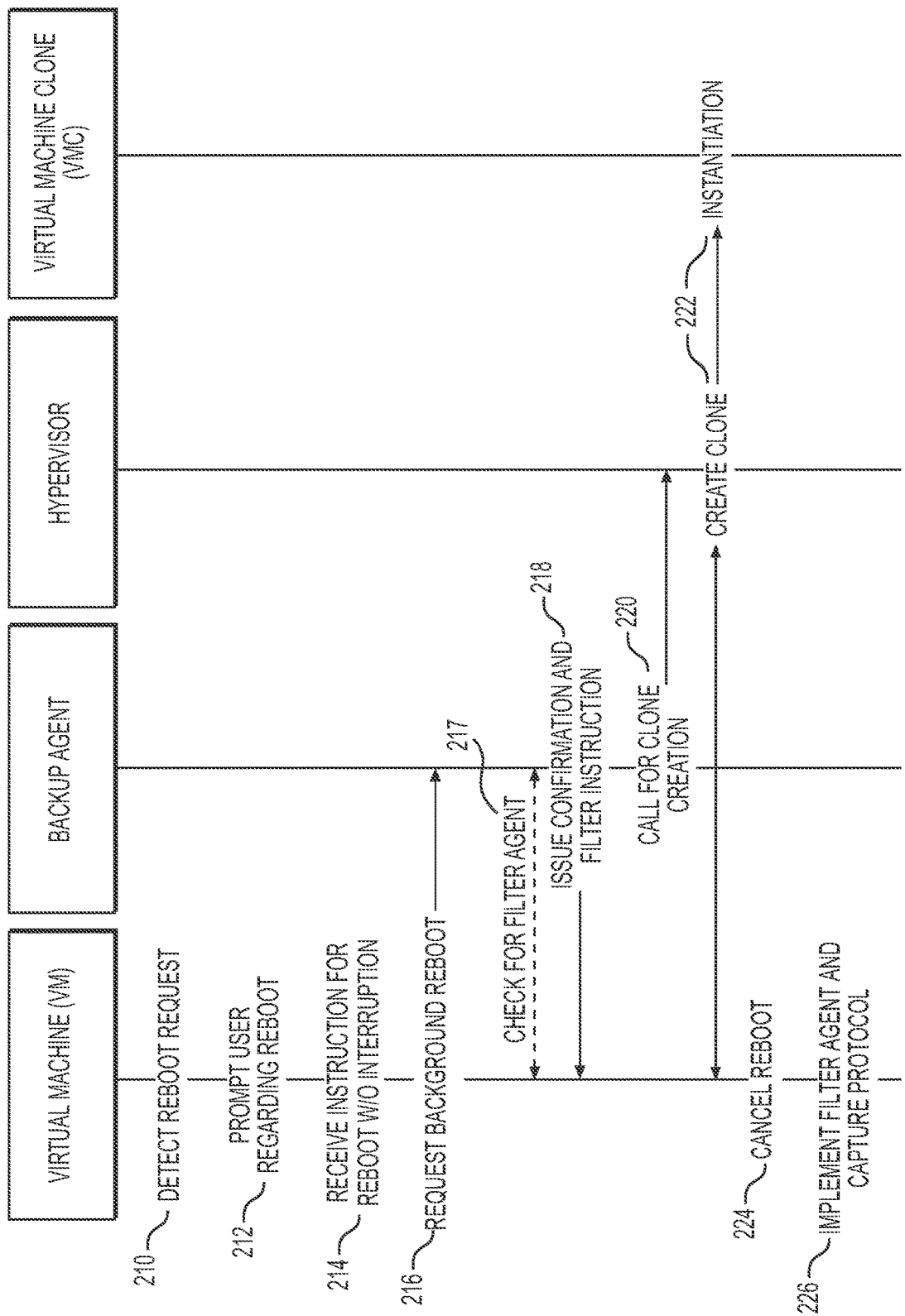
FIG. 2 is a sequence diagram of an exemplary method for cloning a virtual machine.
Figure 3:
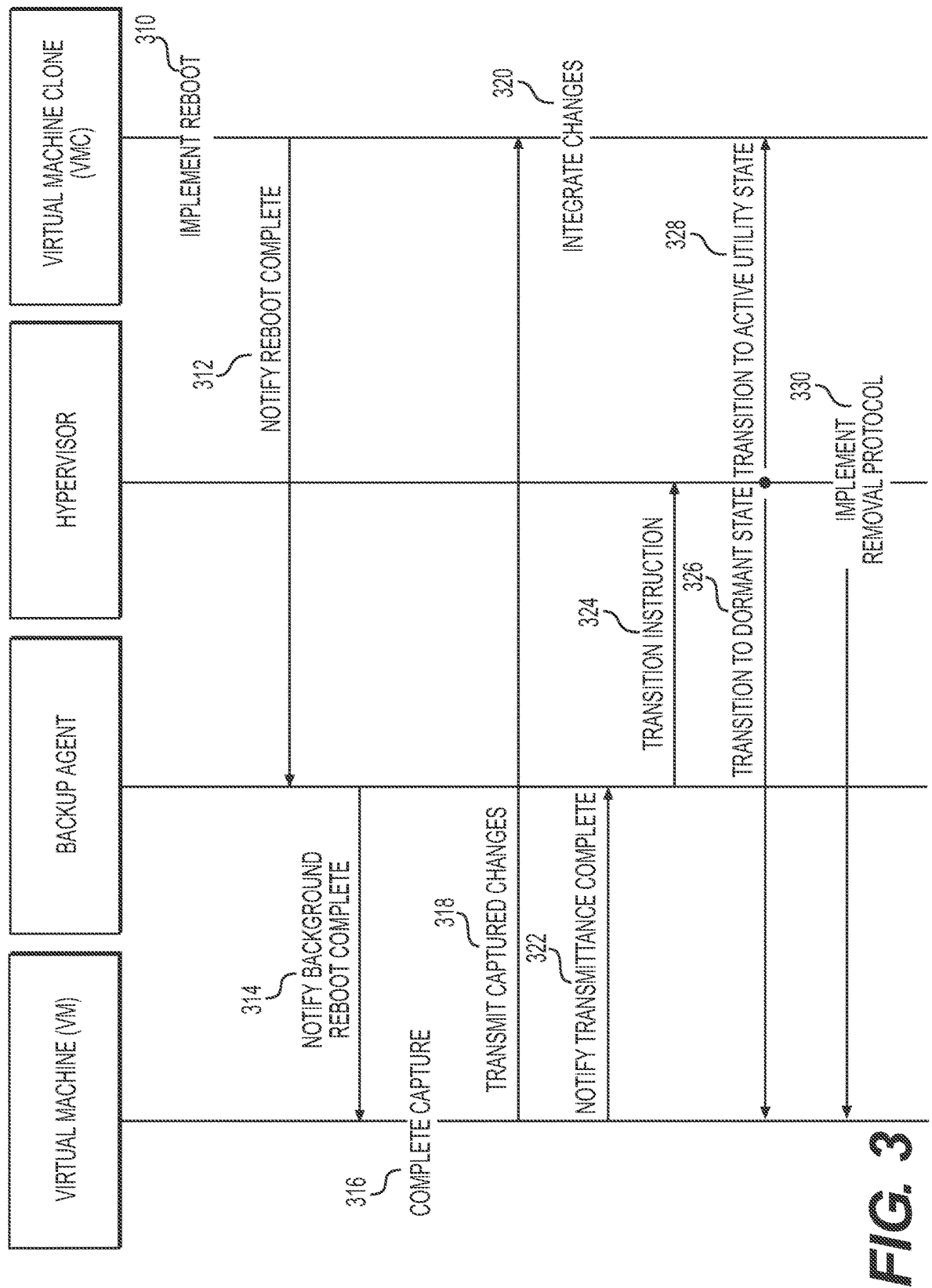
FIG. 3 is a sequence diagram of an exemplary method for integrating changes to a virtual machine into a virtual machine clone.
Figure 4:
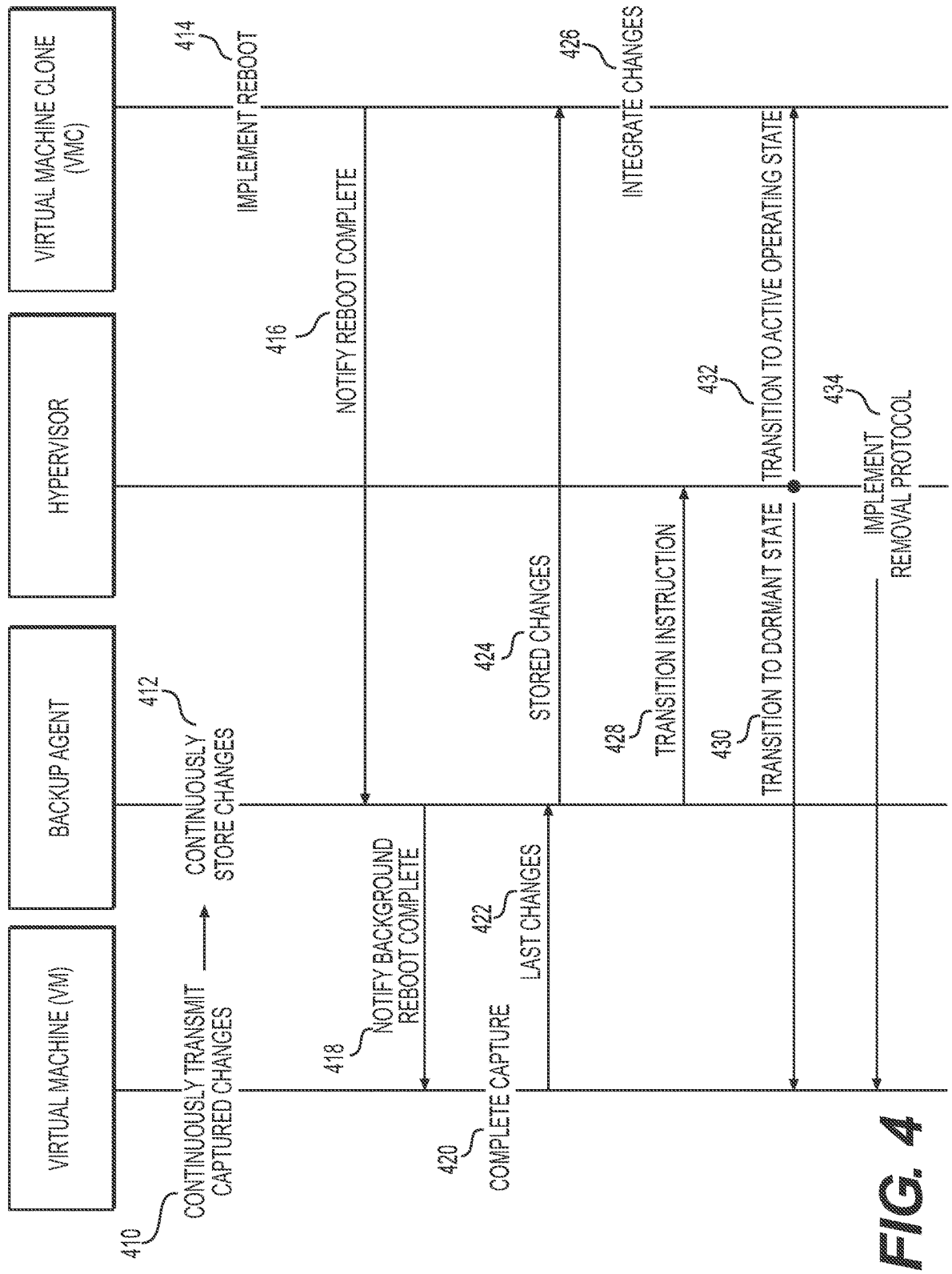
FIG. 4 is a sequence diagram of an exemplary method for integrating changes to a virtual machine into a virtual machine clone.
Figure 5:
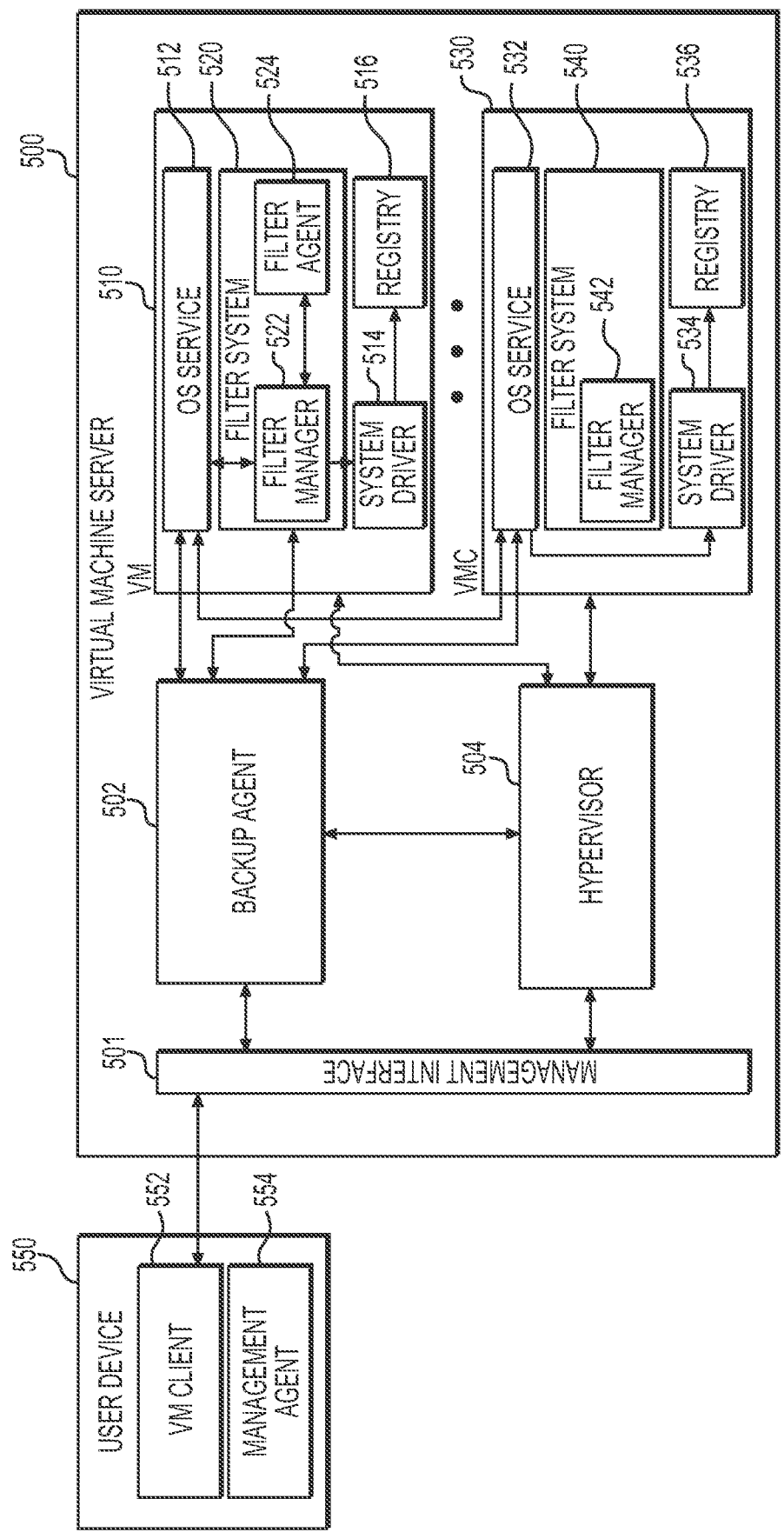
FIG. 5 is an exemplary illustration of system components for cloning a virtual machine and integrating changes to the virtual machine into a virtual machine clone.

FIG. 1 provides a flowchart of an example method for cloning a virtual machine operating in an active state. The illustrated method further provides for integrating changes to the virtual machine occurring during a reboot operation, into a virtual machine clone operating in a maintenance state. FIG. 2 provides a more detailed sequence diagram for a portion of the method of FIG. 1 including a cloning process. FIG. 3 provides a more detailed sequence diagram for an example of a portion of the method of FIG. 1, including an integrating process. FIG. 4 provides a more detailed sequence diagram for another example of a portion of the method of FIG. 1, including an integrating process. FIG. 5 provides an illustration of an example system for performing the methods of FIGS. 1-4. FIGS. 6A-E provide illustrations of a virtual machine operating in an active state and being implemented on a user device, and representations of a virtual machine clone operating in a maintenance state on a server.

Turning to the flowchart of FIG. 1, stage 110 includes receiving a request from a virtual machine (referred to as "VM") operating in an active state to perform a background reboot. The active state can include the VM performing normal I/O operations caused by user, internal operating system, network, or enterprise computing system interactions. The VM can be a virtualization of a physical computing system or device. For example, the VM can be configured to simulate an embedded operating system that supports multiple applications. In one example, the VM is a virtualization of a user device such as a laptop, a mobile device, or other computing device. In another example, the VM is a virtualization of a server.

The background reboot can allow a user to continue using the VM instead of waiting for the VM to restart. Numerous reasons exist why a VM may need to reboot. As a few examples, the VM may need to reboot as part of updating its operating system ("OS"), updating applications that execute on the VM, or to complete installation of a new application. Aspects of the present disclosure apply to virtual machines implementing various operating systems including, but not limited to WINDOWS and Linux operating systems.

The OS and applications on the VM can routinely check for available updates. In one example, the OS of the VM can receive an indication that an update is available. The update indication can be handled by an OS service that determines what the VM will do in response to the update indication. For example, the OS service can execute a pre-shutdown procedure for notifying the user when a reboot is necessary. One example of a pre-shutdown procedure is SERVICE_CONTROL_PRESHUTDOWN, which is used by WINDOWS. The pre-shutdown procedure can be called by the OS service as part of notifying a user that the VM needs to restart.

In one example, the OS service can implement the pre-shutdown procedure to instead prompt the user regarding whether they would like to update in the background so they can continue using the VM. If the user selects to do so, the process for a background reboot can begin. Alternatively, the pre-shutdown procedure of the VM can be configured to automatically initiate a background reboot and notify the user that the background reboot is taking place. In that example, the pre-shutdown procedure can display a notification to the user of the VM that the background reboot is occurring.

To initiate the background reboot, the VM can send a request to a backup agent. The backup agent can operate separately from the VM, such as on the server that hosts the VM or on a separate server. The backup agent can communicate with a hypervisor to manage various steps of the background reboot, as will be described in detail.

The request for the background reboot can be sent to the backup agent by the OS service. The OS service can send the request in response to receiving an instruction from a user, an application, or a computing device. The instruction can indicate that an operational state of the VM is not to be interrupted by a reboot previously detected, scheduled, or prompted for by the OS service.

The VM can persist in a dormant, active, or maintenance state. In a dormant state, a virtual machine can be stored on a server with a respective operating system inactive and ceasing from any operations. The active state can include the virtual machine performing normal I/O operations while it is implemented on a computing device other than a computing device, such as a server, from which it is accessed. A maintenance state may encompass substantially all operations that can be executed by a virtual machine such as the VM operating in the active state. However, these operations are executed while the virtual machine is not being implemented on a computing device that is different from the virtual machine server.

A reboot can be a process in which file systems can be initialized, drivers can be loaded, operating systems can be updated, applications can be updated or installed, and patches can be installed. The reboot can include a startup sequence that starts an operating system of a virtual machine as it is initialized from the dormant state for operation in the active or maintenance state. In addition, the reboot may include an initial set of operations performed by a virtual machine as it is reimplemented in the active or maintenance state. According to an aspect of the present disclosure, a background reboot can encompass the same processes of a reboot originally detected by a virtual machine, being performed with a clone of the virtual machine.

Both the OS service of the VM and the backup agent can include respective device-level and application-level management sub-agents. Device-level management sub-agents can include an Application Programming Interface ("API"), agent application, hypervisor, or virtualized device. Application-level management sub-agents can include an API, Software Development Kit ("SDK"), application wrapper, or workspace agent application. The device-level management sub-agent can include system level privileges. The application-level management sub-agent can include privileges in managed applications. These privileges can be developed for operation with a computing device implementing, or on which is implemented, a virtual machine, or a server(s) implementing agents such as the management and backup agents. Reference to the OS service and the backup agent is understood to include either or both of the device-level and application-level management sub-agents unless otherwise specified.

The VM can execute on and be accessed from a virtual machine server. In one example, the virtual machine server can be one or more servers. In one example, the virtual machine server can implement a respective management interface separately from an implementation of the backup agent. In one example of a separate configuration, the backup agent can be implemented on a different server than the management interface being implemented by the virtual machine server. In another example of a separate configuration, the virtual machine server can implement both of the backup agent and the management interface. In another example, the virtual machine server can implement the backup agent as the management interface.

At stage 120, a first instruction is sent to a hypervisor of the virtual machine server to create a clone of the VM. For example, the backup agent can send the first instruction, causing the hypervisor to generate a VM clone ("VMC"). The VMC can be a copy of the VM, including the same OS, stored data, files, and settings. The first instruction can be issued by the backup agent to the hypervisor directly, or through a management interface of the virtual machine server. The hypervisor can operate on the virtual machine server to generate, manage, and support multiple virtual machines that can be accessed from the virtual machine server. Processes on the virtual machine server can communicate with instances of virtual machines through the hypervisor, such that resources can be shared with operating systems of the virtual machines.

The hypervisor can clone a virtual machine operating in the active state, the maintenance state, or the dormant state. In addition, the hypervisor can clone a virtual machine that includes a call for a reboot. Further, the hypervisor can cause any virtual machine it generates to operate in the maintenance state.

In response to the request for the background reboot, the backup agent specifies the VM is to be cloned by the hypervisor while the VM operates in the active state. Based on the first instruction, which can include additional communications, the hypervisor can cause the VMC to reboot after the VMC has been created. The user can continue using the VM while this occurs. In other words, the hypervisor can maintain the VM in the active state while the VMC reboots in the maintenance state.

Stage 130 includes capturing changes to data in the VM occurring during cloning and while the VMC reboots. By capturing these changes in the interim, the system can later synchronize the rebooted VMC with the VM, as will be described.

In one example, the backup agent can cause a filter agent to be implemented by the VM to capture input and output (I/O) operations performed by the VM. The filter agent can be installed or activated in a filter system of the VM by the backup agent, or by the OS service of the VM via an instruction from the backup agent. The filter agent can be a file system driver in the OS kernel. As one example, WINDOWS can implement a MiniFilter Driver to capture I/O operations at the VM. The system can extend the MiniFilter Driver to record I/O operations and data changes at the VM. In one example, the system can extend and utilize multiple different filter agents on the VM to capture different changes. These changes can include new or updated files, applications, and registry entries.

In one example, the management or backup agent can specify which I/O operations the filter agent will filter. This can include specified I/O request operations, fast I/O operations, and system callback operations. For each I/O operation filtered by the filter agent, a preoperation callback routine, a postoperation callback routine, or both can be registered for the filter agent with a filter manager of the filter system.

Where the filter system includes other filter agents, the management or backup agent can define a priority of the filter agent relative to the other filter agents in stage 130. In handling an I/O operation filtered by the filter agent and one of the other filter agents, the filter manager can call the appropriate callback routine for the filter agent, which registered for that operation with a respective priority. When that callback routine returns, the filter manager can call the appropriate callback routine for another filter agent registered for the operation and with a lower priority.

Changes to the VM captured with the filter agent filtering I/O operations, can be continuously stored in or transmitted by the VM. In one example, the backup agent can specify that the changes be transmitted to the VMC directly, or through a server that stores the changes while the VMC performs the reboot. In one example, the changes are stored on a separate server that can include the backup agent. Further, the backup agent can transmit the changes to the VMC in real time except when the VMC is performing the reboot.

Stage 140 can include integrating the changes captured by the filter agent into the VMC after the reboot is completed by the VMC. In one example, the VMC can send the backup agent a notification that the reboot has been completed. Upon reboot, the VMC has not received any of the changes that occurred during the interim at the VM, beginning at the time the background reboot was requested. These changes at the VM may include new files, files modified from respective instances at the time of the request at stage 110, or new or updated applications installed in the VM.

In one example, the backup agent can instruct the OS service for the VM to transmit the changes, for example in a step file, directly to an OS service of the VMC. This process advantageously does not require an intermediary to temporarily store the changes, which can add time and complexities to the overall method.

In another example, the backup agent can provide a bridge between the VM and the VMC. The backup agent can continuously receive and store the changes in real time from the VM during the reboot by the VMC. After the reboot, the backup agent can resume communication with the VMC now operating in the maintenance state. The backup agent can subsequently transmit the changes in a step file with an instruction for integration by the VMC. Accordingly, resources for the VM that may be used to store the changes can be freed during the background reboot process. This may also be advantageous where a step file with the changes includes a substantial amount of data. Transmitting such a file at one time may tie up substantial resources of the VM and affect performance, and is therefore better stored and transmitted by an intermediary such as the backup agent.

In another example, the backup agent can continuously send the changes from the VM that continues to operate in the active state after the background reboot has been performed. In yet another example, the backup agent can switch the manner in which the changes are transmitted. The backup agent can cause the VM to pause its respective transmittance of any ongoing changes, and direct the OS service of the VM to send these stored changes directly to the VMC.

Stage 150 can include sending a second instruction to the hypervisor to transition the VM and VMC from respective operating states. This can include transitioning user control from the VM to the VMC. The second instruction may be issued by the backup agent and received by the hypervisor. The second instruction can direct and cause the hypervisor to transition the VM from the active state to the dormant state. For example, the hypervisor can transition the VM from being accessed by the computing device to residing on the virtual machine server in a dormant state that is marked for removal. Simultaneously or immediately after the transition of the VM, the hypervisor can transition the VMC from the maintenance state to the active state. More specifically, the VMC will transition to being accessed by the computing device.

Stage 160 can include the backup agent causing the hypervisor to remove the VM. Removal of the VM can include the hypervisor removing the VM from a location on the virtual machine server where the VM was previously accessed. In one example, the VM can persist in the dormant state for a period of time, in case an error occurs when transitioning user access to VMC. Otherwise, the hypervisor can delete the VM.

In one example, the backup agent can direct the hypervisor to remove the VM by deleting it from a respective location on the virtual machine server automatically, subject to user authorization, or through a combination of these protocols. In the case of automatic deletion, the hypervisor can delete the VM immediately, or after a predetermined period of time following the transition to the dormant state. In the case of user authorization, the backup agent can cause the VM or VMC to prompt a user to accept the transition.

The backup agent can also cause the virtual machine server to prompt a user-administrator to confirm deletion of the VM, in an example. In a combinational scheme, the backup agent can prompt a user for authorization, and the hypervisor can delete the VM after a predetermined period of time for which authorization is not obtained. A time period for any of the cases described can be defined by the backup agent.

In another example, the hypervisor may store the VM in a different location for a period of time that can be defined by the backup agent. In one example, the backup agent can direct the hypervisor to store the VM in a storage space of the VMC. In another example, the VM can be stored in the dormant state on a separate server that includes, for example, the backup agent. In either case, the VM may be accessible by a user, the backup agent, or the hypervisor to be transitioned back into the active state. Accordingly, should an issue arise with the VMC, such as a loss of data resulting from the execution of the reboot, the VM can be retrieved. Deletion of the VM from the VMC or the separate server can be executed according to any of the deletion protocols described in present disclosure.

As an alternative to any of the methods described herein, the VMC can be transitioned to the active state and the VM can been transitioned to the maintenance state immediately after the VM is cloned. In this case, user control is switched over to the VMC immediately after respective generation. The backup agent can communicate with the OS service for the VMC to cause implementation of the filter agent while the VM performs the reboot. Changes to the VMC can be captured by the filter agent and transmitted to the VM for integration. The backup agent can send the hypervisor an instruction to transition the VM back to the active state, and transition the VMC to the dormant state. The instruction can further provide for removal of the VMC by the hypervisor.

FIG. 2 provides an example sequence diagram encompassing the stages directed toward a cloning process described in FIG. 1, and showing interactions between various system components. At stage 210, the VM, operating in the active state on a computing device, can detect a reboot. In particular, the OS service operating on the VM can detect the reboot, or call for the reboot to service the VM.

At stage 212, the VM can issue a notification of the pending reboot to a user. For example, the pre-shutdown procedure can cause a notification to display in the VM environment displayed in the computing device. The notification can allow the user to choose between rebooting the VM or performing a background reboot. The notification can also describe the reason for the reboot, such as an update that is being performed. In one example, the notification can include scheduling and duration information, processes that will be completed, and information identifying applications or systems being updated. The notification can be displayed to the user in any manner, such as in a pop-up on the desktop of the VM, in a message delivered to an email inbox, or as a reminder from a calendar application.

At stage 214, the VM can receive a selection of an option for completion of the reboot without an operational interruption of the virtual machine (background reboot operation). The option can be included in the notification, or made active subsequent to the issuance of the notification. The option for the background reboot can be one of several selectable options for obtaining more information about the reboot.

At stage 216, the VM can request completion of the background reboot with the backup agent. The request can specify the operations encompassed in the reboot and be issued by the OS service that detected the reboot.

At stage 217, the backup agent can optionally check the VM for a filter agent in response to the request for the background reboot. The VM can include a filter system with one or more filter agents previously installed. In this optional stage, the backup agent can determine if a filter agent required for capturing changes to the VM is installed, and determine its priority with respect to other filter agents.

At stage 218, the backup agent can issue a confirmation and filter instruction to the VM. The confirmation can include a notification that the operations encompassed in the reboot can be performed by a virtual machine operating in the maintenance state. The confirmation can further include an instruction for canceling the reboot on the VM during or after a cloning process. In one example, the confirmation can specify a time required for the background reboot to be completed. The filter instruction can include an instruction for implementing a filter agent in the filter system of the VM, and a capture protocol.

The implementation instruction can include the filter agent for installation, and specify that the filter agent is to be installed and initialized during a cloning process. In another example, the filter system of the VM may already include the required filter agent. In this case, the implementation instruction may specify a priority of the filter agent relative to other filter agents. The implementation instruction can further specify that the filter agent be initialized during the cloning process, and include a location where changes captured by the filter agent be written to or stored. In one example, the implementation instruction can specify the changes be stored on the virtual machine and transmitted by the OS service to the backup agent or the VMC. In another example, the implementation instruction can specify the filter agent write the changes to a volume located on a separate server that can include the backup agent.

The capture protocol can specify a priority of changes that can be captured by the filter agent relative to any that cannot, and include an instruction for the computing device to store any uncapturable changes in a respective memory or storage. The capture protocol can further specify an instruction for issuing a notification, by the VM or VMC displayed at the computing device, of changes that were not captured in the filter agent.

At stage 220, the backup agent can instruct the hypervisor to clone the VM. The backup agent can specify that the VM be cloned with the call for the reboot. Further, the backup agent can specify that the VMC operate in the maintenance state on the virtual machine server once cloned. In one example, the call for the clone can be routed directly from the backup agent operating as a management interface of the virtual machine server including the hypervisor. In another example, the backup agent can persist on a separate server, or on the virtual machine server in addition to a management interface. The call for the clone can be routed from the backup agent to the hypervisor through the management interface.

At stage 222, the hypervisor can clone the VM, instantiating the VMC. The VM can continue to operate in the active state, allowing continued use by the user, from the time of the original detection of the reboot through an initialization of the cloning process.

In one example, the hypervisor can create a clone of the VM even though the VM is running in an active state. For example, VMWARE's InstantClone technology can be used to create a VMC with the same OS, files, registry, and data as the VM at the moment of cloning. In one example, the hypervisor can generate a clone of a virtual machine in 1.0 to 1.5 seconds. In another example, a user logged into the VM operating in the active state will also be logged into the VMC upon generation, but prevented access to the VMC by the hypervisor. However, this dual login can enable direct communication between OS services of the VM and the VMC in one example.

At stage 224, the VM can cancel the reboot. Accordingly, the VM will not perform the reboot, and in one example, will not prompt a user for authorization to execute the reboot again. In another example, the VM may set an expiration period for receiving a notification that background reboot has been completed. If a notification of completion is not received, the OS service for VM may prompt a user for authorization to execute the reboot on the VM.

At stage 226, the VM can implement the filter agent and the capture protocol according the to filter instruction received from the backup agent at stage 218. In one example, the filter agent can be a file system driver or extension thereof. The filter agent can function inside a kernel of the OS of the VM. The filter agent can actually include multiple filter agents installed or activated in the filter system. The filter agent can capture all disc and VM I/O operations, as well as any changes to a file system and registry of the VM. In one example, the filter agent can intercept any I/O operations or changes to the file system and registry, or a system driver of the VM. In addition, the filter agent can log any changes to the VM that could not be saved, or were required to be saved locally on the VM. As will be explained with reference to FIGS. 3 and 4, the filter agent can cause the changes to be stored, for example, in a step file, on the VM, or transmitted to another location.

FIG. 3 provides an example sequence diagram encompassing stages that can follow the sequence of FIG. 2. In particular, the stages of FIG. 3 are directed toward integrating and transitioning described in FIG. 1, and showing interactions between various system components. At stage 310, the VMC, operating in the maintenance state, can execute the reboot originally detected by the VM. Accordingly, any operations specified for the VM in the reboot will be executed on the VMC. This can include installing updates, in an example.

At stage 312, the backup agent can receive a notification from the VMC that the reboot is complete. The OS service of the VMC can notify the backup agent, in one example. The notification can include information about the operations performed by the VMC as a result of the reboot. The notification may indicate any issues occurring during the reboot. In response to the notification, the backup agent can notify the VM that the background reboot is complete at stage 314. During and after these stages, the VMC can continue to operate in the maintenance state.

At stage 316, the filter agent can complete capturing changes to the VM. The filter agent can specify a location for the changes to be directed in response to the notification in stage 314, and according to the filter instruction of stage 218. In one example, the filter agent can store the changes in a step file. In another example, an agent responsive to the filter agent can direct file system and registry write operations to a specified writable volume accessible by the OS service for the VM.

At stage 318, the VM can transmit the changes captured by the filter agent directly to the VMC. A user operating the VM can be logged into both the VM and the VMC simultaneously. The shared credentials can allow the OS services of the VM and the VMC to communicate directly. Accordingly, the captured changes can be accessed and sent directly to the OS service of the VMC by the OS service of the VM.

At stage 320, the VMC can integrate the changes captured and transmitted by the VM. In one example, a step file including all of the changes can be pushed to the VMC. The changes can be implemented by repeating the same I/O or by copying over changed files, applications, and registry information.

At stage 322, the VM can notify the backup agent that the changes have been transmitted. At stage 324, the backup agent can send a transition instruction to the hypervisor in response to the notification. The transition instruction can specify a protocol for transitioning the VMC into the active state, as well as a removal protocol for the VM. In one example, the transition protocol can specify that the transition is to occur immediately after reception of the instruction. In another example, the transition protocol can specify a series of prompts for a user to respond to in order to choose when a transition to the VMC can occur. In another example, the hypervisor or backup agent can cause the VM to prompt the user for authorization to transition. For example, the OS service of the VM can display a notice allowing the user to authorize the transition. As another alternative, after a predetermined period of time or a predetermined number of declinations, the hypervisor can complete the transition automatically.

At stage 326, the hypervisor transitions the VM to the dormant state from the active state. At stage 328, the hypervisor transitions the VMC from the maintenance state to the active state. Accordingly, a user may be switched from control of the VM to control of VMC at stage 328. Stage 328 may occur simultaneously, or shortly after, the transition in stage 326. Advantageously, the total time for the transitions in stages 326 and 328 is considerably less than the time required to complete a reboot operation, saving the user significant downtime. In one example, the transition can be performed over a period equal to or less than a virtual machine cloning process for the hypervisor. Thus, the amount of downtime during which a user cannot be using a virtual machine is significantly reduced, increasing productivity of that user. In the event that the transitions do not occur before the VM undergoes any further changes, the filter agent can be reimplemented by the OS service of the VM.

At stage 330, the hypervisor can implement a removal protocol included in the transition instruction. The removal protocol can specify a destination for the VM and a deletion policy. In some examples, the VM can be deleted immediately, or after a predetermined period of time by the hypervisor. In other examples, the VM can be stored on a separate server or in a storage space of the VMC. In the latter case, the removal protocol may specify a removal policy for the hypervisor to push to the OS service for the VMC. In addition, the VM can be accessible for a defined period of time for reimplementation if there is an issue with the VMC.

FIG. 4 provides another example sequence diagram encompassing stages that can follow the sequence in FIG. 2. In particular, the stages of FIG. 4 are directed toward the integrating and transitioning described in FIG. 1, and showing interactions between various system components. At stage 410, the VM continuously transmits the changes to the backup agent. In one example, the OS service for the VM transmits the changes. In another example, the filter agent can direct file system and registry write operations encompassing the changes directly to the backup agent. At stage 412, the backup agent can continuously store the changes in a step file, for example.

In one example, the VM can additionally store the changes prior to transmitting the changes to the backup agent. The redundant storage protocol can ensure that all changes captured by the filter agent are integrated into the VMC. In one example, the VM can redundantly store the changes for a limited period of time set by the backup agent.

At stage 414, the VMC can execute the reboot. As a result, the backup agent can receive a notification from the VMC that the reboot is complete at stage 416. In one example the OS service for the VMC can send the notification to the backup agent. The notification can include information about the operations performed as part of the reboot. In response to the notification, the backup agent can notify the VM the background reboot is complete at stage 418. During and after these stages, the VMC can continue to operate in the maintenance state.

At stage 420, the filter agent can complete capturing changes to the VM. At stage 422, the VM can transmit the last captured changes to the backup agent. Accordingly, the VM can discontinue implementing the filter agent unless other changes are registered before a transition to the dormant state occurs. In one example, the notification in stage 418 can include a record of the changes the backup agent was able to store. If the VM has been redundantly storing the changes, the VM can compare the record with the changes the VM has stored. At stage 422, the VM can supplement the last changes with any previous changes the backup agent did not store.

At stage 424, the backup agent compiles the last changes into the changes it has been storing, and transmits the stored changes to the VMC. The VMC can integrate the captured changes transmitted by the VM at stage 426. The changes can be integrated by repeating the same I/O or by copying over changed files, applications, and registry information.

At stage 428, the backup agent, having transmitted the stored changes, can issue a transition instruction to the hypervisor. The transition instruction can include transition and removal protocols. The hypervisor, following the transition protocol, can transition the VM to the dormant state at stage 430, and transition the VMC to the active state at stage 432. At stage 436, the hypervisor can implement the removal protocol as to the VM.

In any of the methods described herein, the VM can be a virtualization of a single computing device. Alternatively, the VM can be a virtualization of a server having multiple users. The hypervisor can generate the VMC as a clone of the multi-user server (i.e., the VM). Users of the VM can continue with respective sessions being hosted on the VM, but after the VMC is generated, all the sessions on the VM will be moved to the VMC at the same time.

FIG. 5 is an exemplary illustration of system components for carrying out the methods described above, including those described with respect to FIGS. 1-4. The system can include a virtual machine server 500 and at least one user device 550. The virtual machine server 500 can be one or more servers respectively. The virtual machine server 500 can include a management interface 501, a backup agent 502, and a hypervisor 504. In addition, a virtual machine, VM 510, and a virtual machine clone, VMC 530, can be accessed from the virtual machine server 500.

In one example, the management interface 501 can provide a two-way communication channel between the virtual machine server 500 and the user device 550. The management interface 501 can be in communication with the backup agent 502 and the hypervisor 504. Communications facilitated through the management interface 500 can enable implementation of VM 510 or VMC 530 on the user device 550. The backup agent 502 can include one or both of a device-level and an application-level management sub-agent. The backup agent 502 can direct operations of the hypervisor 504 for generating and transitioning virtual machines. In addition, the backup agent 502 can communicate directly with VM 510 and VMC 530 to manage respective reboot and filtering operations. The hypervisor 504 can be implemented on the virtual machine server 500 to generate, manage, and support multiple virtual machines such as VM 510 and VMC 530.

VM 510 is a virtualization of a physical computing device and is configured to simulate an operating system that supports multiple applications. VM 510 includes an OS service 512, a system driver 514, a file system and registry 516, and a filter system 520. The OS service 512 can include device-level and application-level management sub-agents as described herein and manage operations of VM 510. The system driver 514 can process requests from the OS service 512 for I/O operations such as program calls for routines and sub-routines. In addition, the system driver 514 can command various programs, devices, or an operating system to perform the necessary functions to satisfy the request. In one example, the system driver 514 can direct the file system and registry 516 to implement storage, modification, deletion, or duplication requests for respective data.

As illustrated in FIG. 5, VM 510 corresponds to a virtual machine in which a background reboot has been confirmed and a filter agent has been implemented. The filter system 520 includes a filter manager 522 and a filter agent 524. Due to the implementation of the filter agent 524, the filter manager 522 intercepts I/O operation requests from the OS service 512 and directs them to the filter agent 524.

VMC 530 represents a clone of VM 510 before the filter agent 524 was implemented. An OS service 532, a driver system 534, a file system and registry 538, and a filter system 540 represent exact clones of their respective counterparts in VM 510 prior to implementation of the filter agent 524. FIG. 5 illustrates an exemplary situation where the filter agent 524 was installed as part of an implementation after a cloning process. In another example, the filter agent 524 could have been part of the filter system 520 prior to cloning and have a counterpart in VMC 530. However, the cloned filter agent would not be configured to cause the filter manager 542 to intercept I/O operations from the OS service 532.

The user device 550 can be any type of computing device, such as a phone, tablet, watch, laptop, desktop computer, or server. The user device 550 can include a processor and memory storage, and can communicate over a network, such as the interne, in wired or wireless fashion, using one or more components. The user device 550 can include a non-transitory computer-readable medium containing instructions that are executed by the processor. Exemplary non-transitory, computer-readable mediums include RAM and ROM, disks, and other memory and storage that is accessible by a USB port, a floppy drive, CD-ROM, or DVD-ROM drive, and a flash drive, among others.

The user device 550 can further include a VM Client 552 and a management agent 554. The VM Client 552 can be a managed application that is installed on the user device 550 as part of enrolment in an enterprise mobility management ("EMM") system. The VM Client 552 can provide access to VMs managed by the enterprise on the virtual machine server 500. In one example, the management interface 501 can exchange communications with the management agent 554 to authenticate the VM Client 552 and connect to a virtual machine. The VM Client 552 can request implementation of a virtual machine from the virtual machine server 500. The virtual machine server 500 can implement VM 510 or VMC 530 for access by the user device 550 through the management interface 501 and the hypervisor 504. In one example, the management interface 501 can open a socket for sending graphics information from VM 510 or VMC 530, to the VM Client 552. The socket can be used for sending user interface events from the user device 550 to VM 510 or VMC 530.

Figure 6A:
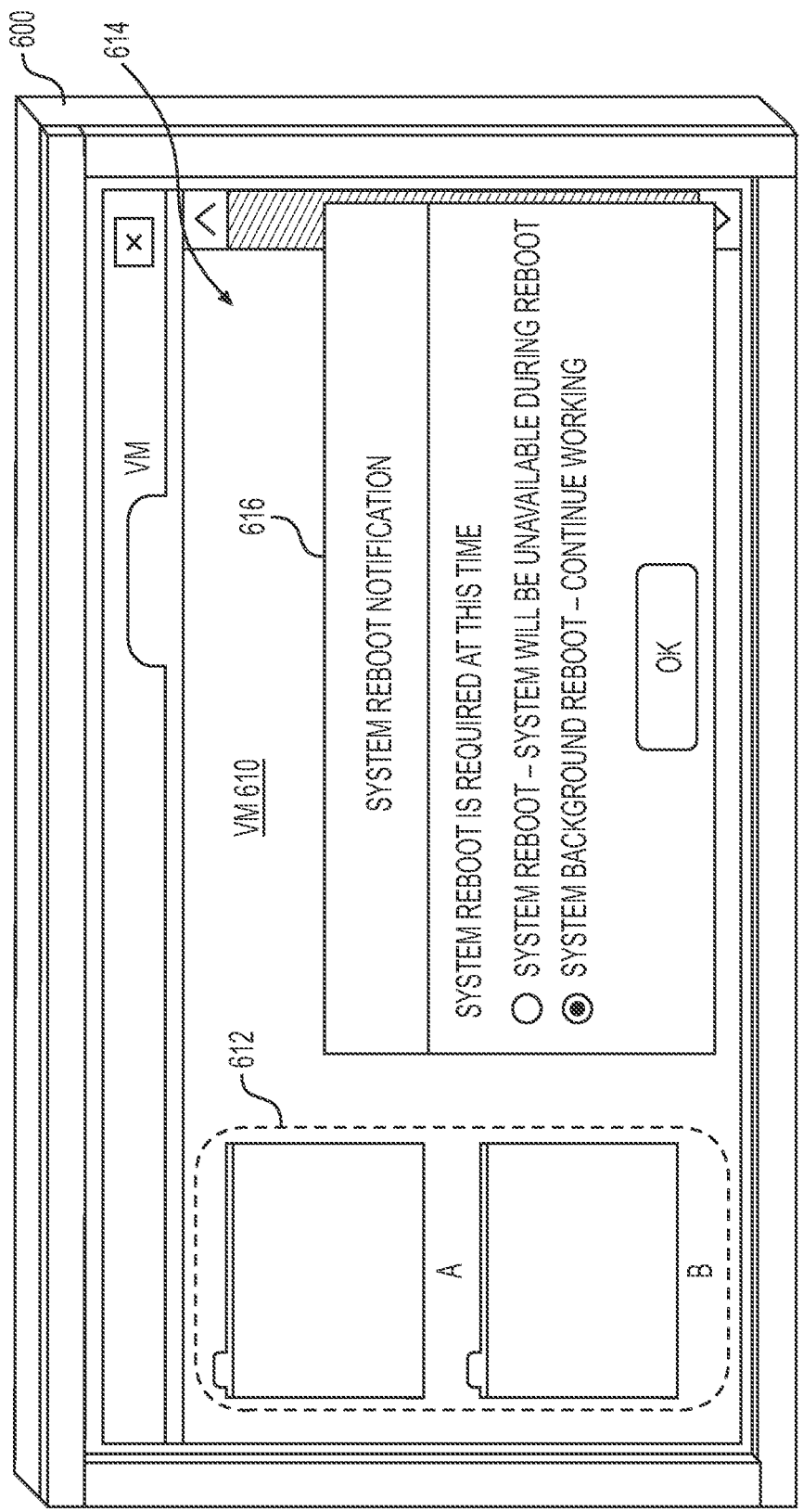
FIG. 6A is an exemplary illustration of a virtual machine being implemented on a user device.

FIGS. 6A-E provide exemplary illustrations of a user device 600 and a virtual machine server 602 during implementations of various stages of the methods described herein. FIG. 6A illustrates a virtual machine, VM 610, being implemented on the user device 600. In order to implement VM 610 in this manner, a user must be logged into VM 610. In this example, some of the data stored by VM 610 is represented as folders 612 in a user interface 614 implemented by VM 610 on the user device 600. In addition, FIG. 6A illustrates a reboot operation notification 610 generated by VM 610. The notification 610 can provide an option to implement the reboot immediately. If selected, VM 616 will be unavailable to the user during the reboot, and reduce the user's ability to utilize VM 610 to be productive.

Figure 6B:
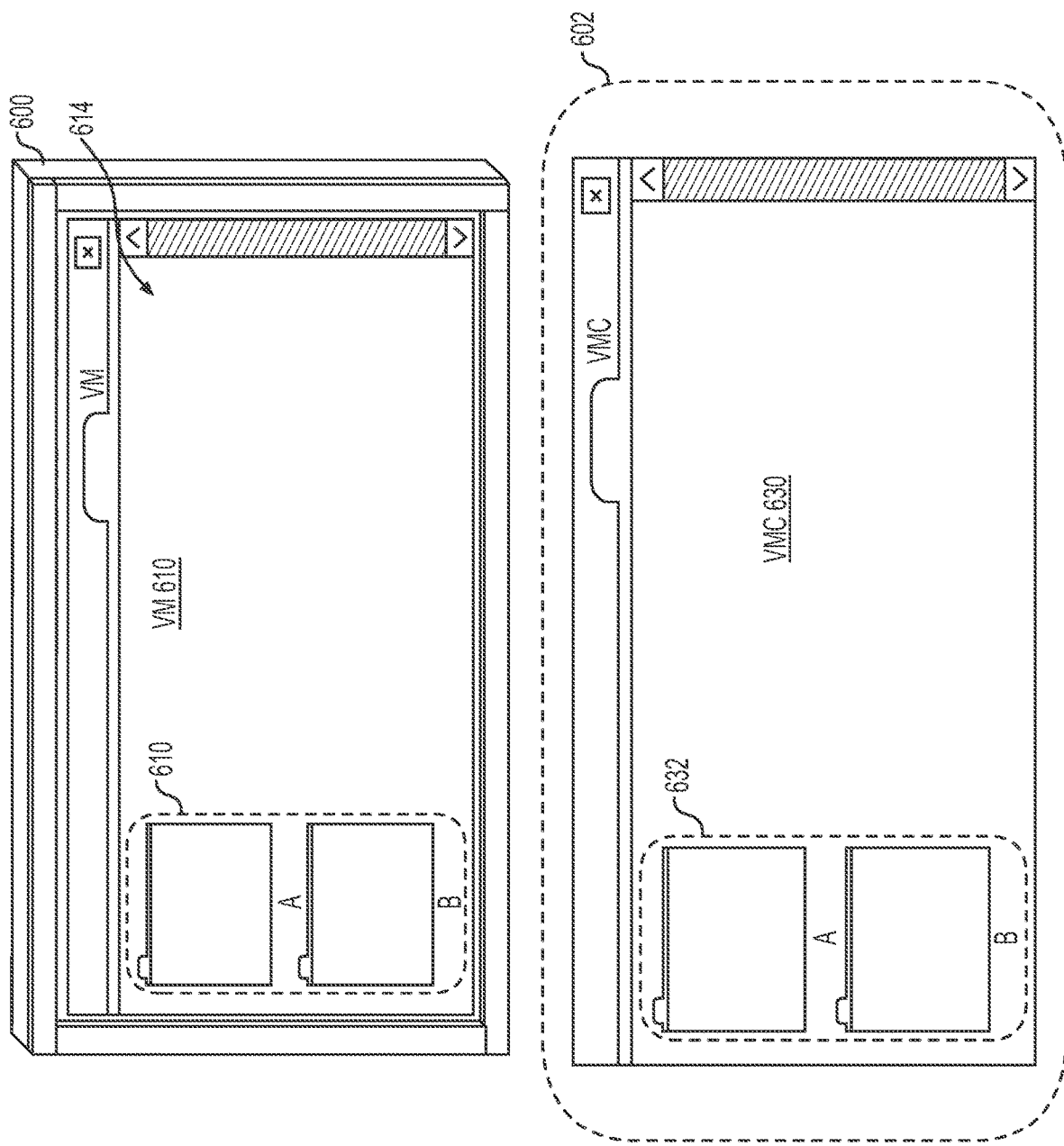
FIG. 6B is an exemplary illustration of a virtual machine being implemented on a user device and a representation of a virtual machine clone operating on a server.

The notification can additionally provide an option to continue working on VM 610 and have a background reboot performed. Upon selection, the virtual machine server 602 will create a virtual machine clone. A representation of the virtual machine clone operating in the maintenance state is illustrated in FIG. 6B, and designated as VMC 630. Data for VMC 630 corresponding to the data represented by folders 612 in VM 610, are represented as folders 632. FIG. 6B illustrates a time immediately after the background reboot was selected. Accordingly, VMC 630 is an exact clone of VM 610 and includes the call for the reboot.

Figure 6C:
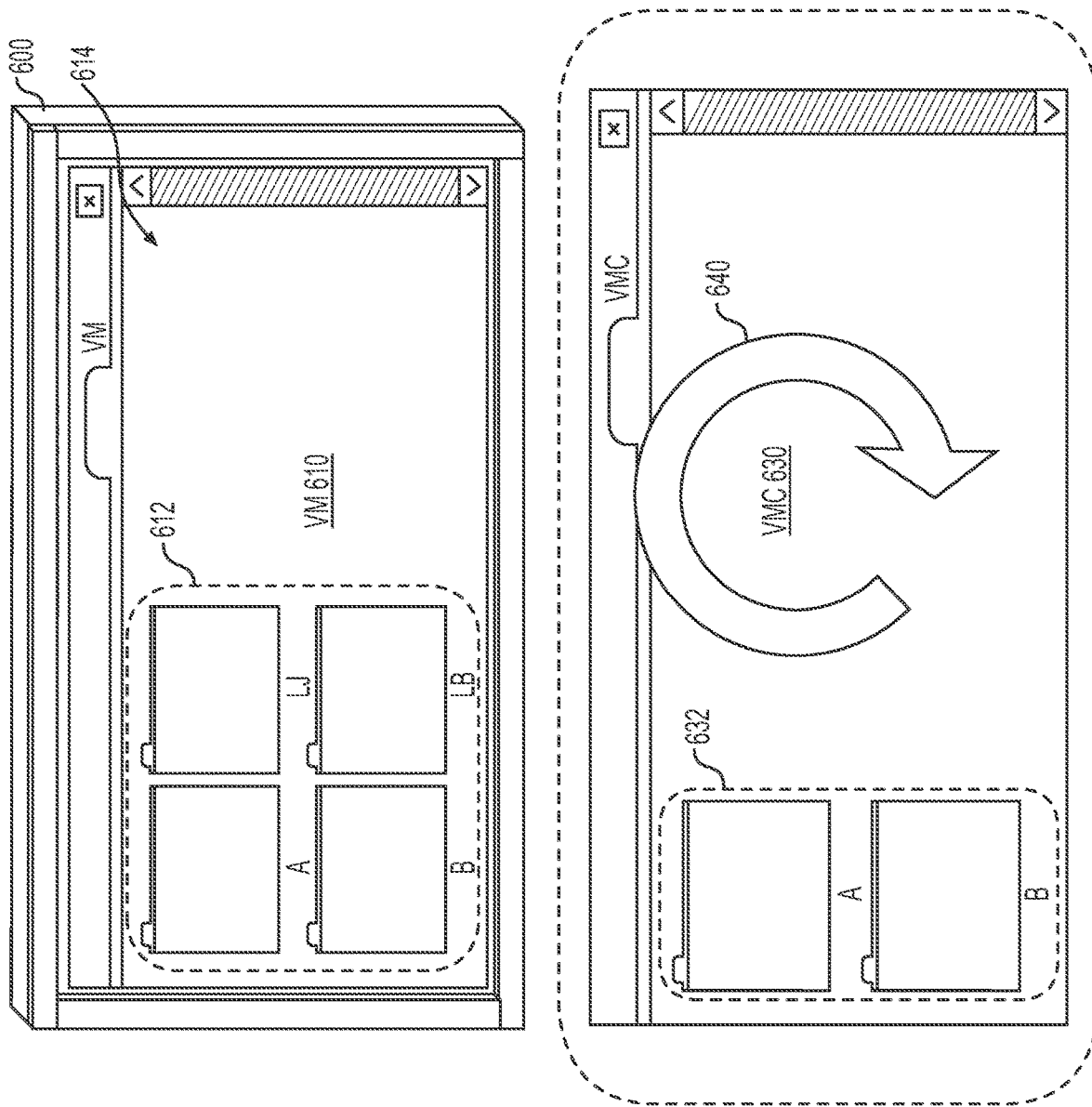
FIG. 6C is an exemplary illustration of a virtual machine being implemented on a user device and a representation of a virtual machine clone operating on a server.

FIG. 6C provides and exemplary illustration of VM 610 and VMC 630 during the background reboot. As the use of VM 610 has continued, changes to VM 610 have occurred, as represented by an increase in the number of folders 612. During this time, a filter agent for VM 610 has been capturing the changes. It will be understood that the increase in the folders 612 is merely representative of I/O operations, or changes to files, programs, and an operating system that a filter agent according to the present disclosure can capture. As the changes are being captured, VMC 630 performs the reboot represented by numeral 640.

Figure 6D:
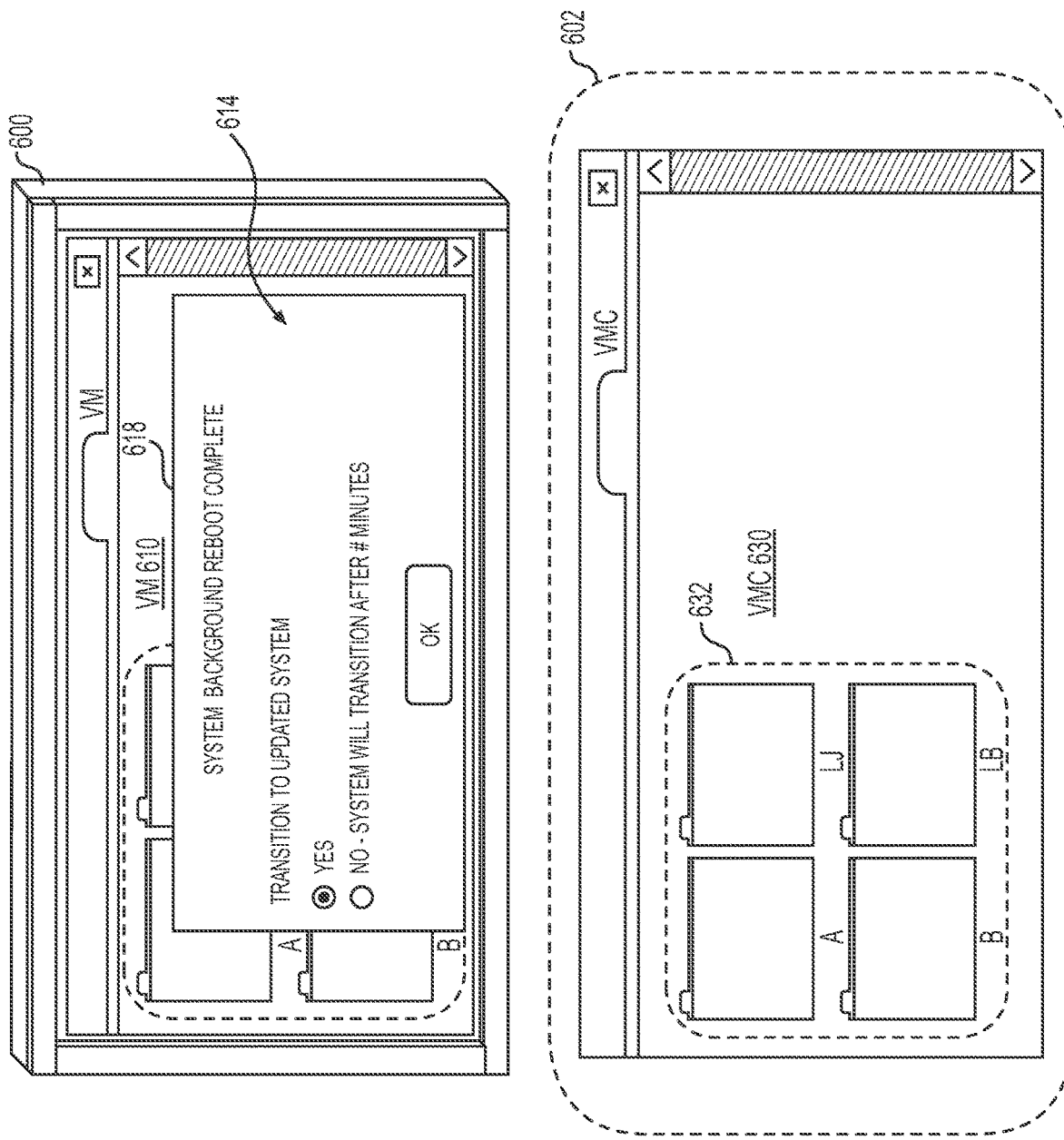
FIG. 6D is an exemplary a virtual machine being implemented on a user device and a representation of a virtual machine clone operating on a server.

FIG. 6D provides an exemplary illustration of VM 610 and VMC 630 after the background reboot has been completed. Further, the captured changes to VM 610 have been integrated into VMC 630 as represented by the folders 632 in FIG. 6D being the same as the folders 612 in FIG. 6C. In addition, a notification 618 that the background reboot is complete is provided through the user interface 614 implemented by VM 610. The notification 618 provides a selectable option to transition to VMC 630.

Figure 6E:
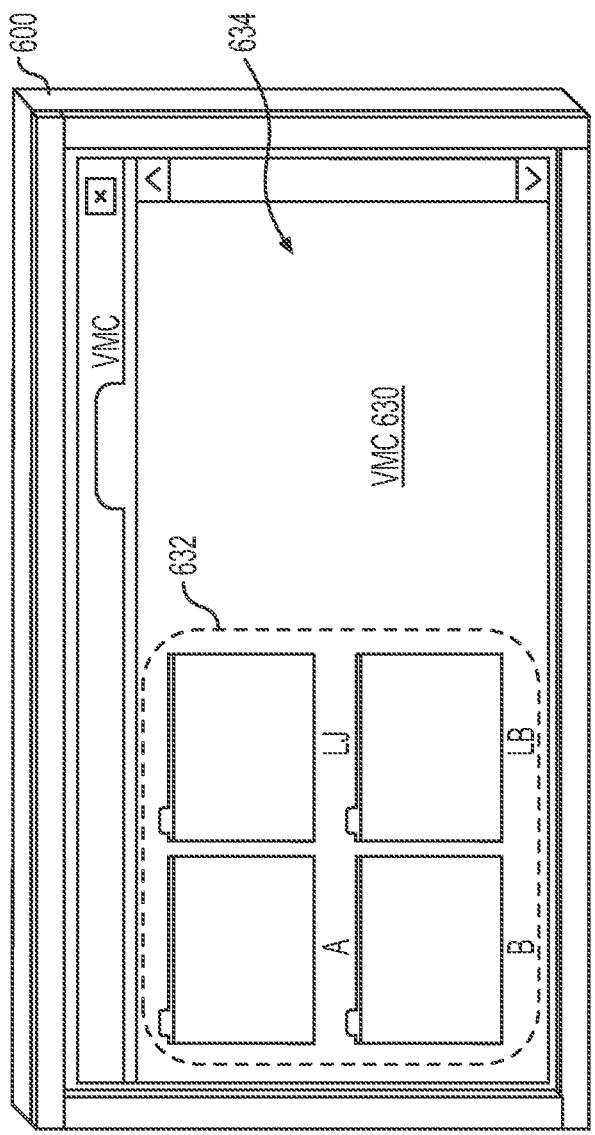
FIG. 6E is an exemplary illustration of a virtual machine clone being implemented on a user device.

FIG. 6E provides an exemplary illustration of VMC 630 being implemented on the user device 600. Accordingly, VMC 630 has been transitioned from the maintenance state to the active state, and VM 610 has been removed by the virtual machine server 602.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for rebooting virtual machines without operational interruptions, the method comprising:
receiving a request from a virtual machine (VM) to continue operating in an active state during a reboot, the request being received by a backup agent;
sending a first instruction, from the backup agent, that causes a hypervisor to clone the VM and generate a VM clone (VMC) that performs the reboot;
capturing changes to data in the VM at least during the reboot by the VMC;
integrating the changes in the VMC after completion of the reboot by the VMC;
sending a second instruction, from the backup agent, that causes the hypervisor to transition the VM to a dormant state and the VMC to the active state;
storing, with the hypervisor, the VM in the dormant state in one of a storage space of the VMC and a first server based on the second instruction; and
causing the hypervisor to implement a removal of the VM after a predetermined period of time specified in the second instruction,
wherein the VM remains accessible to the VMC for the predetermined period of time.

2. The method of claim 1, further comprising:
sending a confirmation, from the backup agent, to the VM indicating the hypervisor will clone the VM;
wherein the VM continues operation and begins capturing the changes to data in response to the confirmation.

3. The method of claim 1, wherein capturing the changes includes the backup agent sending a filter instruction to the VM, and wherein the VM, in response to receiving a filter instruction from the backup agent, implements a filter agent to intercept input and output operations for the VM before the input and out operations are received by a driver system of the VM.

4. The method of claim 1, wherein integrating the changes includes the VM transmitting the changes directly to the VMC in response to receiving a notification indicating the VMC has completed the reboot.

5. The method of claim 4, wherein a user is logged into the VM and the VMC at least during a time when the VM transmits the changes to the VMC.

6. The method of claim 1, wherein the VMC is accessed from a respective location on the first server, and wherein integrating the changes includes:
continuously receiving the changes from the VM on a second server;
storing the changes received during the reboot in the second server as stored changes; and
transmitting the stored changes to the VMC after receiving at least a notification that the reboot has been completed.

7. The method of claim 1, wherein the second instruction causes the hypervisor to transition the VMC to the active state while being implemented on a computing device operated by a user.

8. The method of claim 1, wherein a removal protocol of the second instruction specifies that the hypervisor remove the VM to the storage space of the VMC for the predetermined period of time prior to deletion.

9. A non-transitory, computer-readable medium comprising instructions that, when executed by a processor, perform stages for rebooting virtual machines without operational interruptions, the stages comprising:
receiving a request from a virtual machine (VM) to continue operating in an active state during a reboot, the request being received by a backup agent;
sending a first instruction, from the backup agent, that causes a hypervisor to clone the VM and generate a VM clone (VMC) that performs the reboot;
capturing changes to data in the VM at least during the reboot by the VMC;
integrating the changes in the VMC after completion of the reboot by the VMC;
sending a second instruction, from the backup agent, that causes the hypervisor to transition the VM to a dormant state and the VMC to the active state;
storing, with the hypervisor, the VM in the dormant state in one of a storage space of the VMC and a first server based on the second instruction; and
causing the hypervisor to implement a removal of the VM after a predetermined period of time specified in the second instruction,
wherein the VM remains accessible to the VMC for the predetermined period of time.

10. The non-transitory, computer-readable medium of claim 9, the stages further comprising:
sending a confirmation, from the backup agent, to the VM indicating the hypervisor will clone the VM;
wherein the VM continues operation and begins capturing the changes to data in response to the confirmation.

11. The non-transitory, computer-readable medium of claim 9, wherein capturing the changes includes the backup agent sending a filter instruction to the VM, and wherein the VM, in response to receiving a filter instruction from the backup agent, implements a filter agent to intercept input and output operations for the VM before the input and out operations are received by a driver system of the VM.

12. The non-transitory, computer-readable medium of claim 9, wherein integrating the changes includes the VM transmitting the changes directly to the VMC in response to receiving a notification indicating the VMC has completed the reboot, and wherein a user is logged into the VM and the VMC at least during a time when the VM transmits the changes to the VMC.

13. The non-transitory, computer-readable medium of claim 9, wherein the VMC is accessed from a respective location on the first server, and wherein integrating the changes includes:
continuously receiving the changes from the VM on a second server;
storing the changes received during the reboot in the second server as stored changes; and
transmitting the stored changes to the VMC after receiving at least a notification that the reboot has been completed.

14. The non-transitory, computer-readable medium of claim 9, wherein the second instruction causes the hypervisor to transition the virtual machine clone to the active state while being implemented on the computing device.

15. A system for rebooting virtual machines without operational interruptions, the system comprising:
a memory storage including a non-transitory, computer-readable medium comprising instructions; and
a first server including a processor that executes the instructions to carry out stages comprising:

receiving a request from a virtual machine (VM) to continue operating in an active state during a reboot, the request being received by a backup agent;

sending a first instruction, from the backup agent, that causes a hypervisor to clone the VM and generate a VM clone (VMC) that performs the reboot;

capturing changes to data in the VM at least during the reboot by the VMC;

integrating the changes in the VMC after completion of the reboot by the VMC;

sending a second instruction, from the backup agent, that causes the hypervisor to transition the VM to a dormant state and the VMC to the active state;

storing, with the hypervisor, the VM in the dormant state in one of a storage space of the VMC and a first server based on the second instruction; and causing the hypervisor to implement a removal of the VM after a predetermined period of time specified in the second instruction, wherein the VM remains accessible to the VMC for the predetermined period of time.

16. The system of claim 15, the stages further comprising:

sending a confirmation, from the backup agent, to the VM indicating the hypervisor will clone the VM;

wherein the VM continues operation and begins capturing the changes to data in response to the confirmation.

17. The system of claim 15, wherein integrating the changes includes the VM transmitting the changes directly to the VMC in response to receiving a notification indicating the VMC has completed the reboot, and wherein a user is logged into the VM and the VMC at least during a time when the VM transmits the changes to the VMC.

18. The system of claim 15, wherein the VMC is accessed from a respective location on the first server, and wherein integrating the changes includes:

continuously receiving the changes from the VM on a second server;

storing the changes received during the reboot in the second server as stored changes; and transmitting the stored changes to the VMC after receiving at least a notification that the reboot has been completed.

19. The system of claim 15, wherein the second instruction causes the hypervisor to transition the VMC to the active state while being implemented on a computing device operated by a user.

20. The system of claim 15, wherein a removal protocol of the second instruction specifies that the hypervisor remove the VM to the storage space of the VMC for the predetermined period of time prior to deletion.

* * * * *